(12) United States Patent
Sachdeva et al.

(10) Patent No.: US 10,042,990 B2
(45) Date of Patent: Aug. 7, 2018

(54) FIELD REVISIONS FOR A PERSONAL SECURITY DEVICE

(71) Applicant: Assa Abloy AB, Stockholm (SE)

(72) Inventors: Kapil Sachdeva, Austin, TX (US); Philip Hoyer, Richmond (GB); Eric F. Le Saint, Los Altos, CA (US); Sylvain Prevost, Austin, TX (US)

(73) Assignee: Assa Abloy AB, Stockholm (SE)

( * ) Notice: Subject to any disclaimer, the term of this patent is extended or adjusted under 35 U.S.C. 154(b) by 0 days.

(21) Appl. No.: 14/386,900

(22) PCT Filed: Mar. 26, 2013

(86) PCT No.: PCT/IB2013/000858
§ 371 (c)(1),
(2) Date: Sep. 22, 2014

(87) PCT Pub. No.: WO2013/144719
PCT Pub. Date: Oct. 3, 2013

(65) Prior Publication Data
US 2015/0047023 A1    Feb. 12, 2015

Related U.S. Application Data

(60) Provisional application No. 61/615,484, filed on Mar. 26, 2012, provisional application No. 61/615,499, filed on Mar. 26, 2012.

(51) Int. Cl.
*G06F 7/04*     (2006.01)
*G06F 21/31*    (2013.01)
(Continued)

(52) U.S. Cl.
CPC ............. *G06F 21/31* (2013.01); *G06F 21/77* (2013.01); *G07C 9/00857* (2013.01)

(58) Field of Classification Search
CPC ............. H04L 63/0853; H04L 41/0803; H04L 63/062; H04L 9/0897; H04L 9/16;
(Continued)

(56) References Cited

U.S. PATENT DOCUMENTS 4,757,534 A * 7/1988 Matyas ............... G06F 12/1408
380/281
6,212,635 B1 * 4/2001 Reardon ................. G06F 21/34
380/30
(Continued)

FOREIGN PATENT DOCUMENTS

EP    2 012 280 A2    1/2009

OTHER PUBLICATIONS

ISO/IEC 7816-13—Identification cards; Integrated Circuit card. Part 13: Commands for application management in a multi-application environment // Cartes D'Identification; Cartes a Circuit Integre. Partie 13: Commandes Pour La Gestion D'Application Dans Un Environnement De Plusieurs Applications, International Standard ISO/IEC., vol. 7816-13, No. First Edition, Mar. 15, 2007, 27 pp, XP009171520.
(Continued)

*Primary Examiner* — Farid Homayounmehr
*Assistant Examiner* — Lizbeth Torres-Diaz
(74) *Attorney, Agent, or Firm* — Muirhead and Saturnelli, LLC

(57) ABSTRACT

Atomically modifying a personal security device includes presenting the personal security device to a reader/writer coupled to an access module, the access module determining if the personal security device includes a factory security mechanism, and, if the personal security device includes a factory security mechanism, using the reader/writer and the access module to replace the factory security mechanism with another security mechanism. The access module may
(Continued)

authenticate the personal security device in connection with replacing the factory security mechanism. Authenticating the personal security device may grant access to a user through a door controlled by the access module. Replacing the factory security mechanism may include replacing an application on the personal security device. An ISO/IEC 7816-13 application management request command may be used to replace the application.

18 Claims, 4 Drawing Sheets

(51) Int. Cl.
    *G06F 21/77*     (2013.01)
    *G07C 9/00*     (2006.01)

(58) Field of Classification Search
    CPC ..... H04L 9/3234; G06F 21/77; G06F 21/123; G06F 12/1408; G06F 21/34; G06F 21/57; G06F 21/40
    USPC ......... 380/255; 726/9, 1–4, 27–28; 713/155, 713/183, 182
    See application file for complete search history.

(56) References Cited

U.S. PATENT DOCUMENTS

| | | | | |
|---|---|---|---|---|
| 2002/0046342 A1* | 4/2002 | Elteto | ............ | G06F 21/32 713/185 |
| 2004/0218762 A1* | 11/2004 | Le Saint | ............ | H04L 63/0421 380/277 |
| 2006/0213970 A1* | 9/2006 | Trajkovic | ............ | G06F 21/32 235/380 |
| 2007/0204323 A1* | 8/2007 | Wilkinson | ............ | G06F 21/57 726/1 |
| 2012/0151563 A1* | 6/2012 | Bolik | ............ | G06F 21/41 726/6 |
| 2012/0257751 A1* | 10/2012 | Everett | ............ | H04L 9/006 380/255 |
| 2013/0061312 A1* | 3/2013 | Fournier | ............ | G06F 21/14 726/9 |
| 2014/0369239 A1* | 12/2014 | Baum | ............ | H04W 84/22 370/255 |
| 2016/0014116 A1* | 1/2016 | Babbidge | ............ | G06F 21/41 726/6 |
| 2016/0156619 A1* | 6/2016 | Lovelock | ............ | G06F 21/34 726/7 |

OTHER PUBLICATIONS

NIST Special Publication 800-56A, "Recommendation for Pair-Wise Key Establishment Schemes Using Discrete Logarithm Cryptography (Revised)," Barker et al., Mar. 2007, 114 pp.

NIST Special Publication 800-56B, "Recommendation for Pair-Wise Key Establishment Schemes Using Integer Factorization Cryptography," Barker et al., Aug. 2009, 114 pp.

"PLAID Authentication Protocol: Government Briefing," Commonwealth of Australia, 2008, 24 pp.

Helmut Scherzer, "FOCUS-ICT Workshop: Multiapplikationskarte," IBM Deutschland GmbH, Secure Systems and SmartCards, 2006, 31 pp.

Eric Le Saint, "Information Technology—Generic Identity Command Set," Part 2: Card Administrative Command Set, B10.12 Input for INCITS Project #2094, ANSI Standard, ANSITS xxx-2011, B1012_2011-00063, Revision 0.22, Nov. 22, 2011.

\* cited by examiner

FIELD REVISIONS FOR A PERSONAL SECURITY DEVICE

CROSS-REFERENCE TO RELATED APPLICATIONS

This application claims priority to U.S. Prov. App. No. 61/615,484, filed Mar. 26, 2012, and entitled "RFID CARD EDGE WITH PRIVACY EXTENSIONS OPTIMIZED FOR SHORT TRANSACTION TIMES" and claims priority to U.S. Prov. App. No. 61/615,499, filed Mar. 26, 2012, and entitled "RFID CARD EDGE WITH PRIVACY EXTENSIONS OPTIMIZED FOR SHORT TRANSACTION TIMES", both of which are incorporated herein by reference.

BACKGROUND OF THE INVENTION

1. Technical Field

This application is related to the field of management and establishment of a security mechanisms and key material in issued personal security devices in a field environment.

2. Description of Related Art

Personal Security Devices (PSDs), for example, smart cards, may use a multi-step process where information and programs necessary to use the PSD are loaded therein by a manufacturer prior to distribution. The information may include an initial security mechanism (SM) that may be used to access the PSD and/or may allow the PSD to be used for secure transactions. The information may also include applications that facilitate the SM provided by the PSD (e.g., a program to facilitate door access may include a specific door access security mechanism). FIG. 1 illustrates a system 30 that uses a card loader 32 and a control device 34 to initialize a PSD 36. The control device 34 (e.g., a programmed computer workstation) contains the initial SM and contains application(s) which are provided to the loader 32 which writes the information to the PSD 36. As shown in FIG. 2, after being initialized, the PSD 36 contains a set of initial applications 42 and an initial SM 44. Of course, other mechanisms (not shown) exist for a manufacturer to initialize the PSD 36.

A manufactured and pre-loaded PSD may be sent to an end user which may then use equipment, such as door access equipment, that reads the PSD and authenticates a holder using an application security mechanism (SM), such as a copy of the secret key or perhaps another, related, key (e.g., a public key corresponding to a private key stored on the PSD). A drawback to such a system is that one purchaser may receive PSDs having the same or similar SMs as PSDs purchased by another, unrelated, purchaser. Thus, it may be possible for a malicious user to use the SM information in the PDSs and/or in the PSD readers to gain unauthorized access to another user's system. Some purchasers guard against this by customizing factory-supplied PSDs with their own SMs after purchase. However, unlike the controlled environment of a manufacturing facility, a user site may not present a sufficient opportunity to reprogram every card received from a manufacturer, especially since, in many cases, partial programming/modification of a personal security device could leave the device in an inconsistent state.

In addition, physical access control systems, while updating applications in the field, do so item by item since, in many cases, an underlying card mechanism does not allow for better updating. If a change needs to be atomic, the reader performing the update may implement some transactional logic to recover from a premature PSD removal without making the PSD unusable, which may require additional memory space on the PSD and possibly complex business logic in the reader. Alternatively, the reader may not implement application level transactional logic and thus, in some situations, the PSD may become unusable if the PSD is prematurely removed while performing an application update.

Note that while the DESFire system (all versions) provides transaction support, the scope of the transactions only span the application data objects, but not system objects or properties such as access keys or application related system data, or the existence of the application. Thus, even with DESFire, it is not possible to use one atomic transaction to securely deploy a new application in the field or even update the state of a PSD involving more than one system object.

Accordingly, it is desirable to provide a system where custom security mechanism(s) and corresponding application(s) may be atomically loaded onto PSDs in an efficient manner.

SUMMARY OF THE INVENTION

According to the system described herein, atomically modifying a personal security device includes presenting the personal security device to a reader/writer coupled to an access module, the access module determining if the personal security device includes a factory security mechanism, and, if the personal security device includes a factory security mechanism, using the reader/writer and the access module to replace the factory security mechanism with another security mechanism. The access module may authenticate the personal security device in connection with replacing the factory security mechanism. Authenticating the personal security device may grant access to a user through a door controlled by the access module. The personal security device may be a smart card, an integrated circuit card, a subscriber identification module (SIM), a wireless identification module (WIM), an identification token, a secure application module (SAM), a hardware security module (HSM), a secure multi-media card (SMMC), or a USB token. Replacing the factory security mechanism may include replacing an application on the personal security device. An ISO/IEC 7816-13 application management request command may be used to replace the application. The personal security device may include an application manager and a plurality of applications managed by the application manager.

According further to the system described herein, computer software, provided in a non-transitory computer-readable medium, atomically modifies a personal security device. The software includes executable code that determines if a personal security device presented to a reader/writer coupled to an access module includes a factory security mechanism and executable code that uses the reader/writer and the access module to replace the factory security mechanism with another security mechanism if the personal security device includes a factory security mechanism. The software may also include executable code that causes the access module to authenticate the personal security device in connection with replacing the factory security mechanism. Authenticating the personal security device may grant access to a user through a door controlled by the access module. The personal security device may be a smart card, an integrated circuit card, a subscriber identification module (SIM), a wireless identification module (WIM), an identification token, a secure application module (SAM), a hardware security module (HSM), a secure multi-media card (SMMC), or a USB token. Executable code that replaces the factory security mechanism may replace an application on the personal security device. An ISO/IEC 7816-13 application management request command may be used to replace the application. The personal security device may include an application manager and a plurality of applications managed by the application manager.

According further to the system described herein, a physical access system includes a reader/writer for a personal security device, an access module coupled to the reader/writer, and a personal security device that is presented to the reader/writer, where the access module determines if the personal security device includes a factory security mechanism and uses the reader/writer to replace the factory security mechanism with another security mechanism if the personal security device includes a factory security mechanism. The access module may authenticate the personal security device in connection with replacing the factory security mechanism. Authenticating the personal security device may grant access to a user through a door controlled by the access module. The personal security device may be a smart card, an integrated circuit card, a subscriber identification module (SIM), a wireless identification module (WIM), an identification token, a secure application module (SAM), a hardware security module (HSM), a secure multimedia card (SMMC), or a USB token. Replacing the factory security mechanism may replace an application on the personal security device. An ISO/IEC 7816-13 application management request command may be used to replace the application. The personal security device may include an application manager and a plurality of applications managed by the application manager.

BRIEF DESCRIPTION OF DRAWINGS

Embodiments of the system are described with reference to the several FIG.'s of the drawings, noted as follows.

DETAILED DESCRIPTION OF VARIOUS EMBODIMENTS

Figure 3:
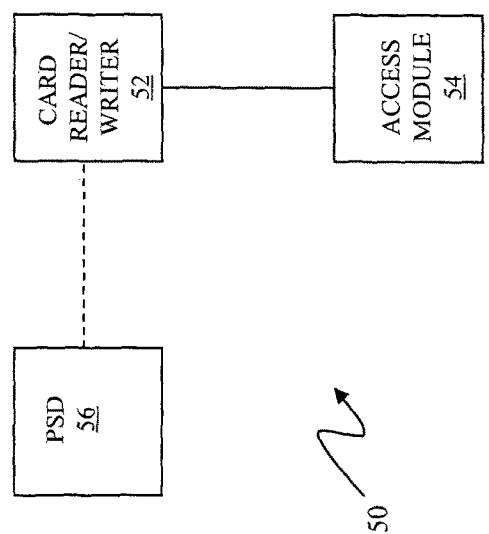
FIG. 3 is a schematic diagram showing a controller, a card reader/writer, and a PSD. according to an embodiment of the system described herein.

Referring to FIG. 3, a diagram 50 shows a card reader/writer 52, an access module 54, and a PSD 56. In an embodiment herein, it is assumed that the PSD is a smart card. However, other types of security tokens may be used instead, including an integrated circuit card, a subscriber identification module (SIM), a wireless identification module (WIM), an identification token, a secure application module (SAM), a hardware security module (HSM), a secure multi-media card (SMMC), a USB token, or a similar portable device that may be carried by a user for access. The card reader/writer 52 may be adapted to read from and write to the PSD 56 depending upon how the PSD 56 is implemented. The system described herein may be generally implemented according to International Standard ISO/IEC 7816-13, with exceptions according to the description herein.

The access module 54 may be a computing device (e.g., a general purpose programmed computing device, a specialized microprocessor, etc.) incorporated into a door or door controller for controlling physical access therethrough and/or may be incorporated into desktops, laptops and/or kiosks for controlling logical and/or physical access to another logical and/or physical entity (e.g., a computer file system). In some embodiments, the access module 54 may be used for payment transactions, loyalty transactions (e.g., frequent flyer miles, shopping points, etc.), and/or for any type of protected transaction and/or operation.

The access module 54 may use PKI-based authentication and ticketing for transit applications and may be capable of establishing a logical communication channel with the PSD 56 and capable of authenticating to the PSD 56. The card reader/writer 52 may be a general purpose computing device or a specialized device capable of establishing a connection with the PSD 56. In one embodiment, the card reader/writer 52 may establish an NFC connection with the PSD 56, although other types of connections are possible. The card reader/writer 52 may be the same device as or may be distinct from the access module 54. The card reader/writer 52 and the access module 54 may be connected using any appropriate means, such as hard wired, WiFi, via the Internet, a private IP network, and/or any other appropriate mechanism for transmitting data therebetween.

The card reader/writer 52 and the access module 54 communicate with the PSD 56 to exchange data therewith as described elsewhere herein. In an embodiment herein, a user presents the PSD 56 to the card reader/writer 52 and is granted or denied access based on the results of applying a security mechanism used by the access module 54 and the PSD 56. In some embodiments, both the PSD 56 and the access module 54 have a shared secret which may be used to authenticate the PSD 56. The term "shared secret" may be understood herein to include symmetric keys and session keys in which each side in a transaction may have the same or a different key that is used for secure communication and authentication. In an embodiment herein, establishing a shared secret may be performed by initially using a public key infrastructure (PKI) key agreement technique such as Diffie-Hellman and/or Elliptic Curve Diffie Hellman (ECDH) along with a public/private key pair of the personal security device 56 and a different public/private key pair of the access module 54. PKI key agreement techniques are described, for example, in IpSec/IKE (Internet Key Exchange Specification) and National Institute of Standards and Technology (NIST) Special Publication 800-56A entitled "Recommendation for Pair-Wise Key Establishment Schemes Using Discrete Logarithm Cryptography" by Elaine Barker et al. (revised, March 2007), which is incorporated herein by reference. See also NIST Special Publication 800-56B for RSA Key transport and U.S. patent application 2004/0218762 titled "Universal Secure Messaging for Cryptographic Modules", which is incorporated by reference herein. Note that any appropriate technique may be used to establish a shared secret between the PSD 56 and the access module 54, such as RSA key transport, which allows the system on one side to generate a shared secret that is involved in the computation of a session key that is transmitted securely using an authenticated public key bound to a private key of the system on the other side.

The system described herein provides a mechanism for initially using a manufacturer/factory installed security mechanism (SM) to grant access while, at the same time, revising the SM and application(s) on the PSD in connection with a use (e.g., the first use). The SM and corresponding application(s) may be modified to be customized SM and corresponding application(s) specifically provided for a specific customer and not generally available to others.

Figure 2:
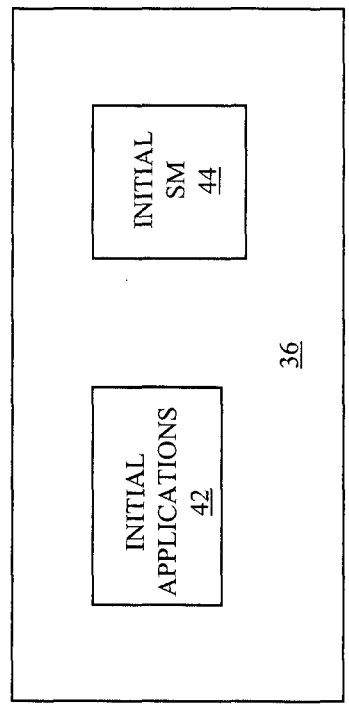
FIG. 2 is a schematic diagram showing a conventional PSD having a set of initial applications and an initial security mechanism.
Figure 1:
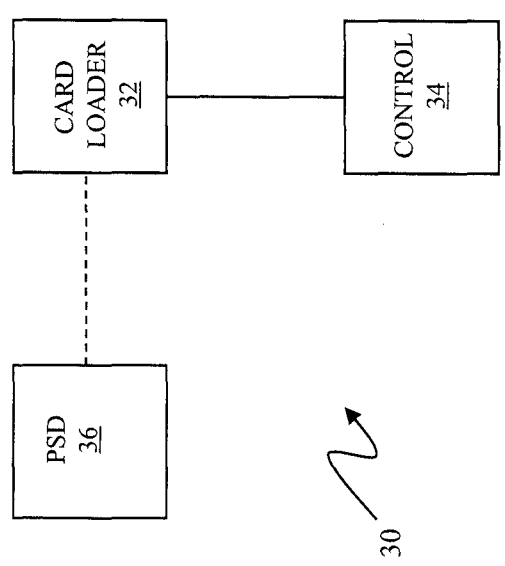
FIG. 1 is a schematic diagram showing a conventional system with a controller, a card loader, and a PSD.
Figure 4:
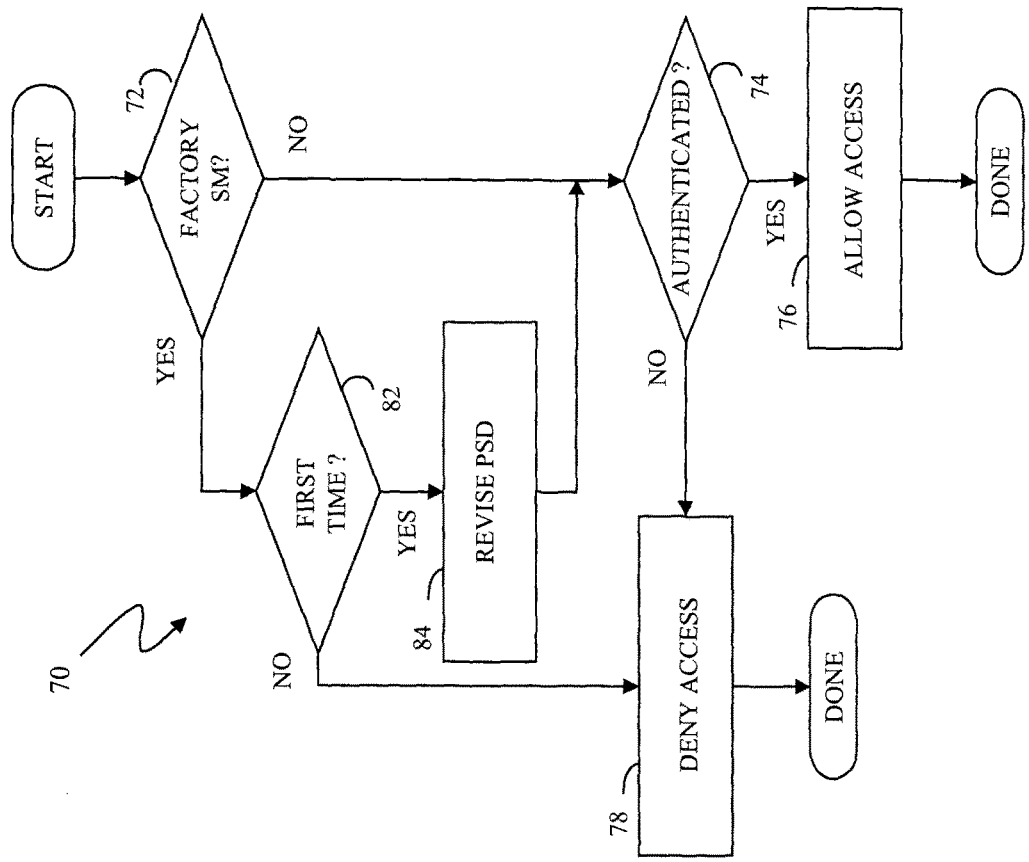
FIG. 4 is a flow chart illustrating steps performed in connection with authenticating and possibly modifying a PSD according to an embodiment of the system described herein.

Referring to FIG. 4, a flow chart 70 illustrates steps performed in connection with the card reader/writer 52 and the access module 54 being presented with the PSD 56 by a user according to the system described herein. Processing begins at a first test step 72 where it is determined if a PSD has a factory SM (i.e., an SM loaded into the PSD by the manufacturer). As discussed elsewhere herein, a customer may receive PSDs with factory SMs and then modify the SMs to be customized customer-specific SMs that may not be generally available to others. If it is determined at the test step 72 that the PSD does not have a factory SM (and thus has a customized SM), then control transfers from the test step 72 to a test step 74 where it is determined if the PSD can be authenticated based on the SM. If so, then control transfers from the test step 74 to a step 76 where access is allowed. Following the step 76, processing is complete. If it is determined at the test step 74 that the PSD can not be authenticated based on the SM, then control transfers from the test step 74 to a step 78 where access is denied. Following the step 78, processing is complete.

If it is determined at the test step 72 that the PSD contains a factory SM, then control transfers from the test step 72 to a test step 82 where it is determined if it is the first time that the PSD 56 has been presented to the access module 54. In an embodiment herein, a factory-loaded PSD is modified to contain company-specific information the first time the PSD is presented to the access module 54. Thus, a PSD containing factory-loaded information should not be presented to the access module 54 after the first time and it is an error, or perhaps an attempt at fraud, if this occurs. Accordingly, if it is determined at the test step 82 that it is not a first time for the PSD with factory-loaded information being presented to the access module 54, then control transfers from the test step 82 to the step 78, discussed above, where access is denied. Following the step 78, processing is complete.

If it is determined at the test step 82 that it is a first time that the factory-loaded PSD is being presented to the access module 54, then control transfers from the test step 82 to a step 84 where the PSD is revised to contain a new security mechanism. In an embodiment herein, the security mechanisms may be provided by applications loaded into the PSD. Revising the PSD at the step 84 is discussed in more detail elsewhere herein. Following the step 84, control transfers to the test step 74, discussed above, where the PSD is authenticated. Thus, note that the system described herein revises the security mechanism in the PSD and, in a corresponding transaction, authenticates the PSD. A user could walk up to an access-controlled door with a factory-loaded PSD and be granted access at the same time. The security mechanism is replaced in way that does not adversely impact the user entering the door. In addition, since the replacement occurs in a single step, the likelihood of incomplete or partial replacement is greatly reduced.

Figure 5:
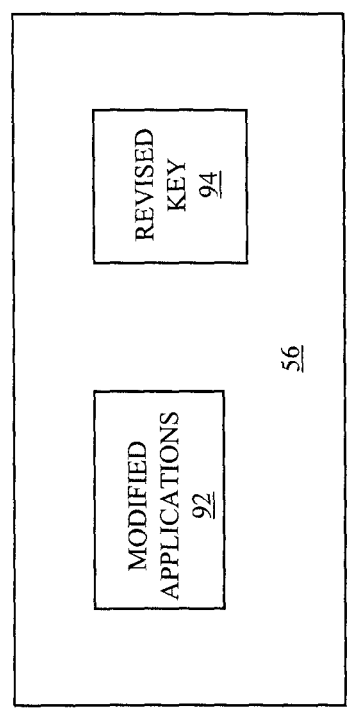
FIG. 5 is a schematic diagram showing a modified PSD according to an embodiment of the system described herein.

Referring to FIG. 5, the PSD 56 is shown as including modified application(s) 92 and possibly a revised key 94. Modifying the application(s) 92 and/or the key 94 provides a custom security mechanism for the PSD 56 so that a malicious user cannot use information from a factory-loaded PSD to circumvent security for a PSD with a custom security mechanism as described herein. The modified application(s) 92 may include any application(s) capable of being provided to the PSD 56.

Figure 6:
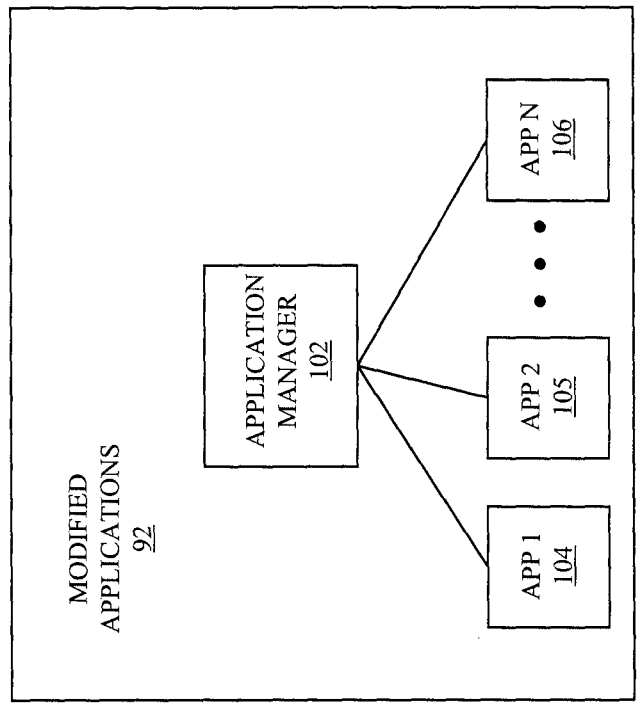
FIG. 6 is a schematic diagram showing modified applications in a PSD according to an embodiment of the system described herein.

Referring to FIG. 6, the modified application(s) 92 are shown in more detail as including an application manager 102 and a plurality of applications 104-106. One or more of the applications 104-106 may provide a security mechanism, such as providing authentication information for egress through controlled doors. In an embodiment herein, at least one of the applications 104-106 is modified in connection with a user first using the PSD for access. The modified one of the applications 104-106 provides a different security mechanism that is used for subsequent accesses by the PSD.

In an embodiment, the Seos Card Technology is used to send a single Application Management Request (AMR) command to the PSD 56. The AMR command, which is described in ISO/IEC 7816-13, provides for replacing or creating a whole application in a single atomic step. The body of the AMR command combines an application level data objects together with system objects like application name, access rights and access keys in a single constructed object.

Another specific embodiment could include a PSD with generic transaction capability which may be provided, for example, using Java card.

In some embodiments, it may be desirable to provide privacy-enhanced discovery, selection and authentication of mobile device credentials from a terminal, reader or authentication server capable of communicating with a mobile device via a NFC, RF or other type of wired or wireless interface. The mobile devices may for example be a contact or contactless smart card, usb token, mobile phone, a Bluetooth or wi-fi portable device, PDA or similar devices having wired or wireless connection means to a communicate. The system described herein may be built on the basis of authentication protocols with session key establishment such as ISO 11770-2 mechanism 6 protocol, other authentication protocols found in ISO 24727-6 registry, Global-Platform or ANSI GICS, and may provide extensions to allow rapid and private discovery of credentials on the mobile device.

The system described herein provides a protocol improvement that facilitates confidential discovery and selection of interoperable credentials with privacy, without requiring several separate commands for credential discovery and selection and therefore without requiring significant additional time to conduct the transaction. The privacy-enhanced authentication protocol uses knowledge of a secret to discover access module 54 contexts that the PSD 56 may open or access. Without the possession of the corresponding keys, accessing one credential on the PSD 56 does not breach the privacy of any other credentials on the PSD 56 (including determining if a given credential is or is not on the PSD 56).

Figure 7:
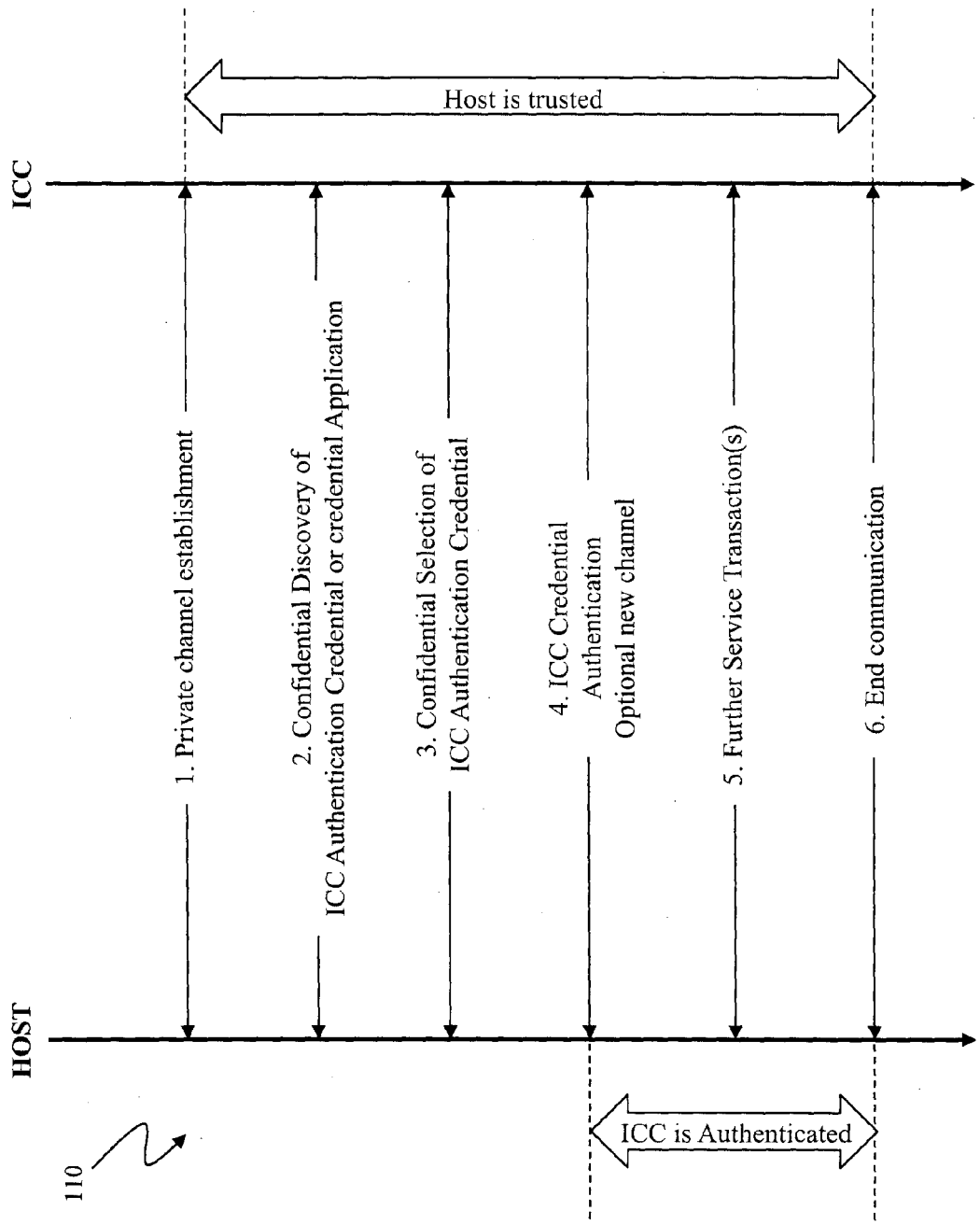
FIG. 7 is a schematic diagram illustrating exchanging information according to an embodiment of the system described herein.

A single proprietary protocol step may allow both the confidential discovery and confidential selection of the PSD 56 based on the authentication context information. Referring to FIG. 7, a diagram 110 shows a plurality of steps that may be performed in connection with the system described herein. Note that step 1 may be implicit if both sides already own a static shared group key. The key or a derived session key may then be used to ensure confidentiality of steps 2-3.

Note also that steps 2 and 3 may be combined as a single step as described in the example embodiment or may be separated to facilitate standardization in the 7816 domain. Steps 4-6 may be typical authentication steps.

A proprietary command may be added to the authentication protocol between the access module 54 and the PSD 56. One embodiment confidentially selects an applet or application containing the credential, using group privacy keys. For example, a command may be used to select one of the ADFs stored on the PSD 56 by an OID associated with the ADF and to transfer back to the IFD information about the selected ADF. The command may be designed to optionally preserve the privacy of the holder of the PSD 56. The information used in the command may include the IFD, which supplies the sequence of OIDs of ADFs with credentials known to the IFD, so that the ICC can look up the OIDs in internal memory and return the selected OID and it's associated information. The command may also signal cryptographic capabilities of the ADF to the IFD, so that subsequent mutual authentication and secure channel communications may be performed using algorithms configured in the ADF. The command may also transfer a PSD specific diversifier so that the IFD can calculate the diversified PSD specific authentication keys for the PSD. Any ADFs which are in a Disabled state may be ignored during the search. If the Global Disable state is active, the search may be performed as usual (respecting the individual Disabled state of each ADF) and if there is an ADF selected by the search, it is saved for potential later retrieval. The command APDU may be completely in plain text, any sensitive parts of the response APDU may be optionally protected to preserve privacy and to prevent recognition of the PSD specific data or the chosen OID. If there is any active authentication with any local key of the currently selected ADF, that authentication may be invalidated after the selection of the new ADF (even if the same ADF is selected as previously).

The answer to the SELECT ADF command may return cryptographic options that define a combination of parameters such as cryptographic algorithms and key lengths which are implemented by the PSD 56. In some embodiments, it may be assumed that each PSD implements only one combination of options that is fixed over the lifetime of the PSD (or at least over the lifetime of the data in the PSD; the PSD being potentially rewritten with other options), while the access module 54 may support all possible combinations of the cryptographic and protocol options so that the access module 54 is interoperable with any possible PSD using SEos.

The answer may also include diversification data that is dynamically encrypted so that different sessions with the same PSD do not contain any data allowing to distinguish the PSD from other PSDs in the system. For example, it is possible to generate a random initialization vector (IV) for a CBC mode of an underlying block cipher and then to encrypt the diversification data in CBC mode with the random IV.

The answer may also include a chosen OID that allows the access module 54 to confirm which OID of the ones provided by the IFD sorted in order of preference was chosen by the PSD 56. This part of the response may also be protected for privacy reasons. The answer may also include a cryptographic Checksum (MAC) over the sent data to prevent the access module 54 from treating arbitrary data as a valid input and possibly forcing the access module 54 to use some weak or known diversified key (by supplying a bogus diversifier), the MAC at the end of the data may ensure that any data with an incorrect MAC is rejected early at a pre-authentication level, even before any diversified key calculation is attempted. The single proprietary command may correspond to a standard select Command, a Put Data and a Get Data, hence a significant performance gain, since two individual NFC commands may be saved.

The system described herein may be implemented using the any appropriate hardware capable of providing the functionality described herein. Thus, for example, the specific components illustrated herein may be replaced with similar components that provide appropriate functionality. It is also possible to provide additional components without departing from the spirit and scope of the invention.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

While the invention has been disclosed in connection with various embodiments, modifications thereon will be readily apparent to those skilled in the art. Accordingly, the spirit and scope of the invention is set forth in the following claims.

What is claimed is:

1. A method of atomically modifying a personal security device, comprising:
presenting the personal security device to a reader/writer coupled to an access module;
the access module determining when the personal security device includes a factory security mechanism loaded into the personal security device by the manufacturer thereof;
when the personal security device includes the factory security mechanism, the access module determining when the personal security device had been previously presented to the access module;
when the personal security device includes the factory security mechanism and the personal security device had been previously presented to the access module, denying access to a user without modifying the personal security device; and
when the personal security device includes the factory security mechanism and the personal security device had not been previously presented to the access module, using the reader/writer and the access module to replace the factory security mechanism with another security mechanism that is used for subsequent accesses, wherein replacing the factory security mechanism with said another security mechanism includes replacing an application on the personal security device by sending an application request command that replaces the application or creates an application in a single atomic step.

2. The method, according to claim 1, wherein the access module authenticates the personal security device in connection with replacing the factory security mechanism.

3. The method, according to claim 2, wherein authenticating the personal security device grants access to a user through a door controlled by the access module.

4. The method, according to claim 1, wherein the personal security device is one of: a smart card, an integrated circuit card, a subscriber identification module (SIM), a wireless identification module (WIM), an identification token, a secure application module (SAM), a hardware security module (HSM), a secure multi-media card (SMMC), and a USB token.

5. The method, according to claim 1, wherein an ISO/IEC 7816-13 application management request command is used to replace the application.

6. The method, according to claim 1, wherein the personal security device includes an application manager and a plurality of applications managed by the application manager.

7. A non-transitory computer-readable medium containing instructions executed in a processor that atomically modifies a personal security device, the instructions comprising:
executable code that determines when the personal security device presented to a reader/writer coupled to an access module includes a factory security mechanism loaded into the personal security device by a manufacturer thereof;
executable code that determines when the personal security device had been previously presented to the access module;
executable code that denies access to a user without modifying the personal security device when the personal security device includes the factory security mechanism and the personal security device had been previously presented to the access module; and
executable code that uses the reader/writer and the access module to replace the factory security mechanism with another security mechanism that is used for subsequent accesses when the personal security device includes the factory security mechanism and the personal security device had not been previously presented to the access module, wherein replacing the factory security mechanism with said another security mechanism includes replacing an application on the personal security device by sending an application request command that replaces the application or creates an application in a single atomic step.

8. The non-transitory computer-readable medium, according to claim 7, the software further comprising:
executable code that causes the access module to authenticate the personal security device in connection with replacing the factory security mechanism.

9. The non-transitory computer-readable medium, according to claim 8, wherein authenticating the personal security device grants access to a user through a door controlled by the access module.

10. The non-transitory computer-readable medium, according to claim 7, wherein the personal security device is one of: a smart card, an integrated circuit card, a subscriber identification module (SIM), a wireless identification module (WIM), an identification token, a secure application module (SAM), a hardware security module (HSM), a secure multi-media card (SMMC), and a USB token.

11. The non-transitory computer-readable medium, according to claim 7, wherein an ISO/IEC 7816-13 application management request command is used to replace the application.

12. The non-transitory computer-readable medium, according to claim 7, wherein the personal security device includes an application manager and a plurality of applications managed by the application manager.

13. A physical access system, comprising:
a reader/writer for a personal security device;
an access module coupled to the reader/writer; and
the personal security device that is presented to the reader/writer, wherein the access module determines when the personal security device includes a factory security mechanism loaded into the personal security device by a manufacturer thereof, determines when the personal security device had been previously presented to the access module, denies access to a user without modifying the personal security device when the personal security device includes the factory security mechanism and the personal security device had been previously presented to the access module, and uses the reader/writer to replace the factory security mechanism with another security mechanism that is used for subsequent accesses when the personal security device includes the factory security mechanism and the personal security device had not been previously presented to the access module, wherein replacing the factory security mechanism with said another security mechanism includes replacing an application on the personal security device by sending an application request command that replaces the application or creates an application in a single atomic step.

14. The physical access system, according to claim 13, wherein the access module authenticates the personal security device in connection with replacing the factory security mechanism.

15. The physical access system, according to claim 14, wherein authenticating the personal security device grants access to a user through a door controlled by the access module.

16. The physical access system, according to claim 13, wherein the personal security device is one of: a smart card, an integrated circuit card, a subscriber identification module (SIM), a wireless identification module (WIM), an identification token, a secure application module (SAM), a hardware security module (HSM), a secure multi-media card (SMMC), and a USB token.

17. The physical access system, according to claim 13, wherein an ISO/IEC 7816-13 application management request command is used to replace the application.

18. The physical access system, according to claim 13, wherein the personal security device includes an application manager and a plurality of applications managed by the application manager.

* * * * *